(12) United States Patent
Voelker et al.

(10) Patent No.: US 9,361,485 B2
(45) Date of Patent: Jun. 7, 2016

(54) TRANSMISSION DEVICE AND SENSOR SYSTEM

(71) Applicant: Fraunhofer-Gesellschaft zur Foerderung der angewandten Forschung e.V., Munich (DE)

(72) Inventors: Matthias Voelker, Fuerth (DE); Johann Hauer, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 357 days.

(21) Appl. No.: 13/950,109

(22) Filed: Jul. 24, 2013

(65) Prior Publication Data

US 2014/0028373 A1  Jan. 30, 2014

(51) Int. Cl.
*G06G 7/12* (2006.01)
*H04Q 9/00* (2006.01)
*G01D 1/10* (2006.01)

(52) U.S. Cl.
CPC .. *G06G 7/12* (2013.01); *G01D 1/10* (2013.01); *H04Q 9/00* (2013.01); *H04Q 2209/84* (2013.01)

(58) Field of Classification Search
CPC .......................................................... G06G 7/12
See application file for complete search history.

(56) References Cited

U.S. PATENT DOCUMENTS

| 4,292,597 | A | 9/1981 | Niimura et al. | |
|---|---|---|---|---|
| 2004/0201510 | A1 | 10/2004 | Tamba | |
| 2004/0263243 | A1* | 12/2004 | Miyazaki | 330/9 |
| 2007/0040635 | A1 | 2/2007 | Popescu et al. | |
| 2008/0143439 | A1* | 6/2008 | Tanimoto et al. | 330/253 |
| 2010/0060324 | A1* | 3/2010 | Etou | 327/103 |

FOREIGN PATENT DOCUMENTS

| DE | 2941321 | 5/1980 |
|---|---|---|
| DE | 102004016842 | 1/2005 |
| DE | 102005056049 | 2/2007 |
| JP | H03-238598 | 10/1991 |
| JP | H07-221679 | 8/1995 |
| JP | H10-141993 | 5/1998 |
| JP | 2005-348521 | 12/2005 |

\* cited by examiner

*Primary Examiner* — Marcus Taningco
(74) *Attorney, Agent, or Firm* — Perkins Coie LLP; Michael A. Glenn (57) ABSTRACT

A transmission device for two electric pulse measurement signals includes a first measurement signal input, a second measurement signal input, a differential measurement signal output and a signal converter. The first measurement signal input serves for receiving a first single-ended measurement signal, the second measurement signal input for receiving a second single-ended measurement signal, wherein the signal converter is implemented, when receiving a first one of the single-ended measurement signals, to convert either the first single-ended measurement signal or the second single-ended measurement signal into a combined differential measurement signal and provide the same at the differential measurement signal output. Here, the differential measurement signal includes a first differential portion which may be allocated to the first single-ended measurement signal and a second differential portion which may be allocated to the second single-ended measurement signal.

15 Claims, 5 Drawing Sheets

TRANSMISSION DEVICE AND SENSOR SYSTEM

CROSS-REFERENCE TO RELATED APPLICATIONS

This application claims priority from German Patent Application No. 102012213092.6, which was filed on Jul. 25, 2012, and is incorporated herein in its entirety by reference.

BACKGROUND OF THE INVENTION

Embodiments of the present invention relate to a transmission device for two electric impulse measurement signals and to a sensor system.

A sensor system may be a photodiode array or a pixel array, for example of a positron emission tomography system for gamma ray detection in medical technology. Every pixel of the pixel array or in general every sensor element outputs a measurement signal when registering a measured quantity or value, e.g. as a result of light incidence or a light pulse. With such applications the measurement signal typically is a so-called single-ended measurement signal. A single-ended measurement signal is an electric signal, like, e.g., a current signal relating to a determined reference signal, like, e.g., a mass signal (applied to a mass conductor), and which may be transmitted using one single signal conductor.

With a high integration density of integrated circuits, singled ended measurement signals frequently lead to crosstalk between the individual circuit blocks and thus between the individual channels, in particular when analog and digital functions are realized simultaneously. In analog circuit technology, such crosstalk may be reduced or prevented by using differential measurement signals. A differential measurement signal transmits the respective signal information on the measured quantity using two signal conductors, wherein the actual signal is a voltage difference or current difference between a first signal portion (transmitted via the first signal conductor) and a second signal portion (transmitted via the second signal conductor). It has no effect on the voltage difference here (on signal information) if, for example, the average value of the first and second signal portions varies due to external interferences which makes the differential measurement signal very resistant to interferences. In order to utilize these advantages in the above-mentioned sensor applications, frequently the singled ended measurement signal of the individual sensor element is converted into a differential measurement signal. There are different circuits or members for such a conversion, like, e.g., a single-ended-to-differential converter (explicit circuit). Alternatively, also a differential amplifier may be used in this respect comprising typically at least two input transistors which contribute to noise in signal processing and increase the total energy demand.

SUMMARY

According to an embodiment, a sensor system may have a plurality of sensor elements each providing pulse-shaped single-ended measurement signals; and at least two single-ended-to-differential converters, wherein each may have a first measurement signal input for receiving a first single-ended measurement signal and a second measurement signal input for receiving a second single-ended measurement signal; a differential measurement signal output; and a signal converter which is implemented to convert the two single-ended measurement signals into a differential measurement signal, wherein the differential measurement signal has a first and a second differential portion as two output signals on two signal lines, and wherein the first portion or the first output signal is derived from the difference of the two input signals, and the second portion or the second output signal is derived from the inverted difference of the two input signals, wherein a first sensor element is connected to a first of the two measurement signal inputs of the first single-ended-to-differential converter and a second sensor element is connected to a first of the two measurement signal inputs of the second single-ended-to-differential converter, and wherein a third sensor element, which is arranged non-adjacent to the first sensor element, is connected to a second one of the two measurement signal inputs of the first single-ended-to-differential converter.

According to another embodiment, a single-ended-to-differential converter may be used for transmitting two electric pulse-shaped single-ended measurement signals, wherein in the single-ended-to-differential converter the first single-ended measurement signal is received via a first measurement signal input and the second single-ended measurement signal via a second measurement signal input; and wherein in the single-ended-to-differential converter the two single-ended measurement signals are converted into a differential measurement signal, so that the differential measurement signal has a first and a second differential portion as two output signals on two signal lines, and wherein the first portion or the first output signal is derived from the difference of the two input signals, and the second portion or the second output signal is derived from the inverted difference of the two input signals.

According to another embodiment, a method for transmitting two electric pulse-shaped single-ended measurement signals may have the steps of receiving the first single-ended measurement signal via a first measurement signal input and the second single-ended measurement signal via a second measurement signal input of the single-ended-to-differential converter; and in the single-ended-to-differential converter, converting the two single-ended measurement signals into a differential measurement signal, so that the differential measurement signal has a first and a second differential portion as two output signals on two signal lines, and wherein the first portion or the first output signal is derived from the difference of the two input signals, and the second portion or the second output signal is derived from the inverted difference of the two input signals.

Embodiments of the present invention provide a transmission device for two electric impulse measurement signals having a first and second measurement signal input, a differential measurement signal output and a signal converter. The first measurement signal input serves for receiving a first single-ended measurement signal, while the second measurement signal input serves for receiving a second single-ended measurement signal. The signal converter is implemented, when receiving one of the single-ended measurement signals, to either convert the first single-ended measurement signal or the second single-ended measurement signal into a combined differential measurement signal and provide the same at the differential measurement signal output, wherein the differential measurement signal includes a first differential portion which may be allocated to the first single-ended measurement signal and a second differential portion which may be allocated to the second single-ended measurement signal.

Embodiments of the present invention are based on the finding that, in the considered applications, in particular very short signals are detected, e.g. pulse signals with a duration of for example 100 ns, wherein the frequency of signal repetition is low, e.g. 6 times per second. Thus, the probability is low that two single-ended measurement signals are transmitted simultaneously. This finding is utilized by the inventive transmission device by the fact that it transmits two single-ended measurement signals of two sensor elements which occur at different times as a combined differential measurement signal, wherein in the differential measurement signal the portions of the same which may either be allocated to the first single-ended measurement signal or the second single-ended measurement signal may be differentiated with respect to their polarity. It is advantageous here that two single-ended measurement signals may be transmitted using a transmission device as an interference-free differential measurement signal. By the (serial) transmission of the two single-ended measurement signals via the same device, the number of transmission devices and thus the current consumption of the sensor system may be reduced, for example by a half. Further, also many manufacturing costs are reduced as the number of transmission devices and thus the utilized electric members is reduced.

According to further embodiments, by the transmission device which, for example, comprises a differential amplifier or a simple single-ended-to-differential converter one of the unipolar single-ended measurement signals is inverted with respect to the other with unipolar single-ended measurement signals so that due to two different polarities in the differential measurement signal the assignability of the different portions in the differential measurement signal with respect to the original single-ended measurement signals remains.

Further embodiments provide a sensor system having a plurality of sensor elements and at least two of the above-described transmission devices. Here, a first sensor element is connected to a first one of the two measurement signal inputs of the first transmission device and a second sensor element is connected to a first one of the two measurement signal inputs of the second transmission device, wherein a third sensor element which is not arranged adjacent to the first sensor element is connected to a second one of the two measurement signal inputs of the first transmission device. By such an interleaved arrangement effects may be measured, like, e.g., the crosstalk of two neighboring or adjacent sensor elements.

Further embodiments provide a method for the transmission of two electric impulse measurement signals. The method includes the steps of receiving a first single-ended measurement signal via a first measurement signal input, receiving a second single-ended measurement signal via a second measurement signal input, converting either the first single-ended measurement signal or the second single-ended measurement signal into a combined differential measurement signal and providing the differential measurement signal at a differential measurement signal output. Here, the differential measurement signal comprises a first differential portion which may be allocated to the first single-ended measurement signal and a second differential portion which may be allocated to the second measurement signal. All in all, in the described method the transmission quality is increased on the one hand by using a transmission method which is more robust with respect to interferences (differential transmission) and by reducing interference signals, like, e.g., noise, or by reducing active members causing interference signals, like, e.g. transistors.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention are explained in more detail with reference to the figures in the following, it is to be noted that like or seemingly like elements or structures are provided with the same reference numerals so that the description of the same is exchangeable or may be mutually applied.

Figure 1A:
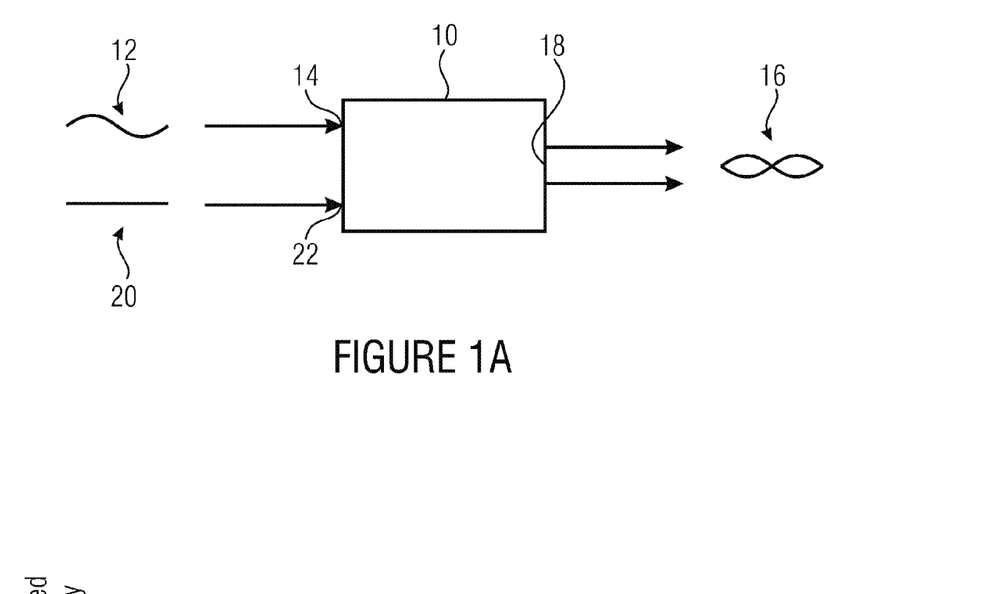
FIGS. 1a-1b are a single-ended-to-differential converter and the associated input and output variables (balanced signal transmission) according to standard technology.

FIG. 1a shows a single-ended-to-differential converter 10 which is implemented to receive a single-ended measurement signal 12 as an input quantity or variable or value via a first measurement signal input 14, convert the same into a differential measurement signal 16 and provide the same at a differential measurement signal output 18 having two signal conductors 18a and 18b. At this point it is to be noted that the single-ended measurement signal 12 is, for example, a voltage signal or a current signal applied with respect to a reference signal 20. The reference signal 20 may, for example, be a mass signal which may be received via a reference signal input 22 of the single-ended-to-differential converter. The individual signals (single-ended measurement signal 12, reference signal 20 and differential measurement signal 16) are explained in more detail with reference to FIG. 1b.

Figure 1B:
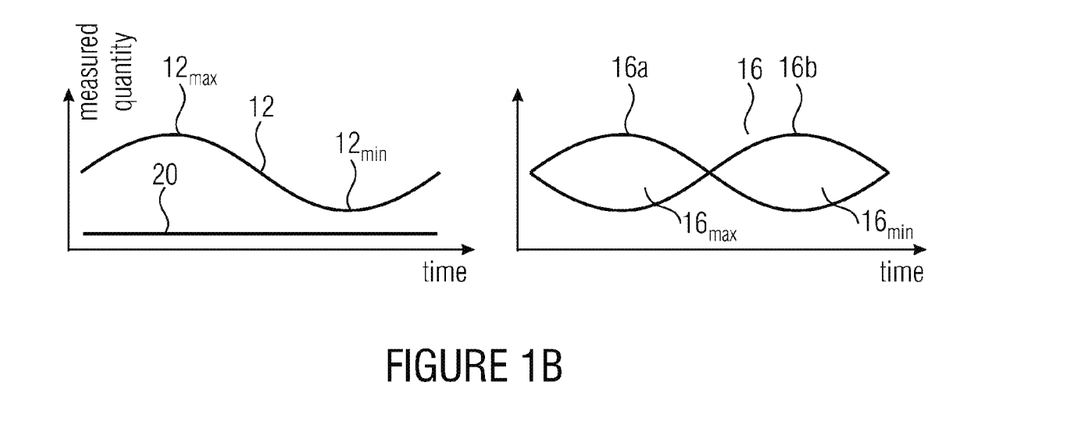

FIG. 1b shows two diagrams plotted over time, wherein the first diagram illustrates the single-ended measurement signal 12 with respect to the constant reference signal 20, and wherein the second diagram illustrates the resulting differential measurement signal 16. For both diagrams the respective measured value represents, for example, a current or a voltage.

In the first diagram, the difference between the single-ended measurement signal 12 and the reference signal 20 is the actual signal information. The single-ended measurement signal 12 comprises a sinusoidal shape and has at least one local maximum $12_{max}$ and one local minimum $12_{min}$. By the above-illustrated single-ended-to-differential converter 10, the single-ended measurement signal 12 is transformed into a differential measurement signal 16 which includes two signal portions 16a and 16b, each transmitted by a separate signal conductor 18a or 18b of the differential measurement signal output 18. In the conversion of the two signal forms, on the one hand a direct transmission of the single-ended measurement signal 12 to the first signal conductor 18a and on the other hand an inversion of the same and transmission to the second signal conductor 18b is executed, wherein here a common-mode rejection is executed.

The actual signal information here represents the difference between the individual signal portions 16a and 16b which is typically double the size as compared to the original single-ended measurement signal 12. The differential measurement signal 16 also comprises a local maximum $16_{max}$ when the signal portion 16a is larger than the signal portion 16b (16a-16b>0) and a local minimum $16_{min}$ when the signal portion 16b is larger than the signal portion 16a (16a-16b<0). The position of the local maxima $16_{max}$ and minima $16_{min}$ on the time axis corresponds to the position of the local maxima $12_{max}$ and minima $12_{min}$ of the single-ended measurement signal 12. As may be seen with respect to the second diagram, the signal portions 16a and 16b which are both transmitted in a separate signal conductor 18a or 18b are symmetrical or balanced with respect to each other. The symmetry of the two signal portions 16a and 16b results from the fact that, by the single-ended-to-differential converter 10, common-mode portions of the single-ended measurement signal 12 are minimized or eliminated in the conversion. Such a signal transmission is very tolerant with respect to interference, as external interferences in the two signal conductors 18a and 18b virtually cancel each other out. The principle is that interference which acts on both signal portions 16a and 16b does shift the individual signal portions 16a or 16b and thus the average value but not the difference between the two signal portions 16a and 16b.

Figure 2A:
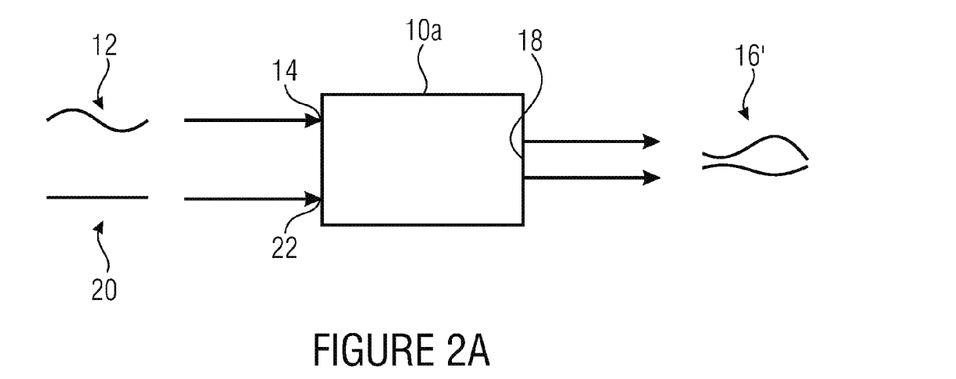
FIGS. 2a-2b are a differential amplifier for a single-ended-to-differential conversion and the associated input and output variables according to standard technology.

FIG. 2a shows a further device for a single-ended-to-differential conversion which comprises a differential amplifier 10a, like, e.g. an operational amplifier. The differential amplifier 10a comprises a first measurement signal input 14 for receiving the single-ended measurement signal 12 which is applied to the reference signal input 22 with respect to a constant reference variable 20. Thus, the single-ended measurement signal 12 is processed together with the reference signal 20 as a differential signal.

In a first diagram, FIG. 2b again shows the single-ended measurement signal 12 together with the constant reference signal 20 plotted over time. In analogy to FIG. 1b, the single-ended measurement signal 12 comprises the local maximum $12_{max}$ and the local minimum $12_{min}$. The differential amplifier 10a is implemented to amplify the difference between the two signals 12 and 20 at the inputs 14 and 22, wherein the reference signal input 22 here is inverting. Thus, by the differential amplifier 10a a differential measurement signal 16' is provided at the differential output 18 which comprises the desired differential-mode signal.

Figure 2B:
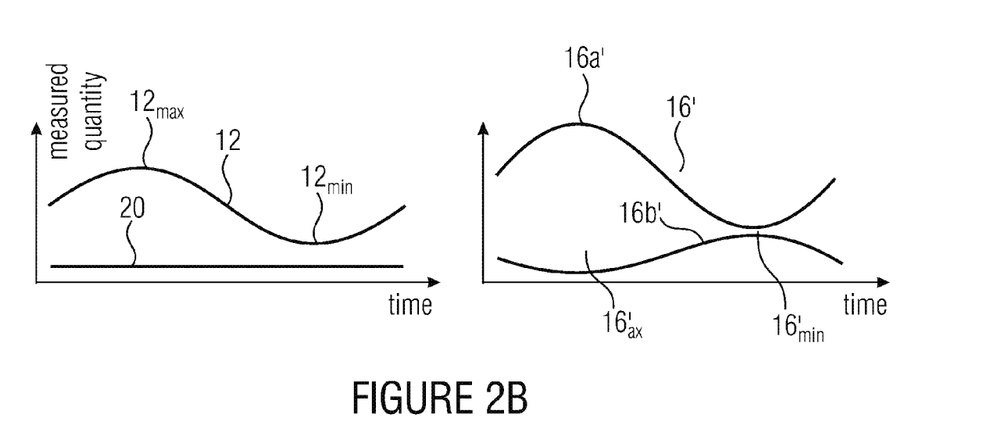

As the differential signal 16' also comprises the unwanted common-mode signal, the same is not symmetrical, as is illustrated in the second diagram. Thus, a common-mode rejection may be implemented which is formed to suppress or reject the common-mode signal (see reference signal 20). The differential measurement signal 16' in turn comprises the first signal portion 16a' and the second signal portion 16b', wherein the actual signal information is contained in the difference between the two signal portions 16a' and 16b' as an absolute value (i.e. 16a'>16b' if 12>20). Thus, the difference between the two signal portions 16a' and 16b' is at a maximum at the time at which the local maximum $12_{max}$ exists at the single-ended measurement signal 12 and at a minimum at the time at which the local minimum $12_{min}$ exists at the single-ended measurement signal 12. These two local maxima or minima in the differential measurement signal 16' are designated by the reference numerals $16_{max}'$ and $16_{min}'$. With inverted polarities of the input signals (12<20, not illustrated), the polarity of the differential signal 16' would also be inverted (i.e. 16a'<16b').

The two devices 10 and 10a illustrated in FIGS. 1a and 2a for a single-ended-to-differential conversion are typically necessitated once per sensor, which on the one hand increases the current consumption, and on the other hand the spatial requirement of the circuit. Thus, devices are discussed in the following which enable the same functionality with reduced current consumption and spatial requirements.

It is assumed here that the single-ended measurement signals to be transmitted are unipolar pulse signals, i.e. signals occurring only over a short period of time (e.g. <200 ns at a frequency of 10 Hz) and here comprise only one positive or one negative signal change or a signal change with only one polarity. Such unipolar pulse signals are typical for the considered applications, i.e. radiation sensors for positron emission tomography systems (PET) or for single photon emission computer tomography systems (SPECT).

Figure 3A:
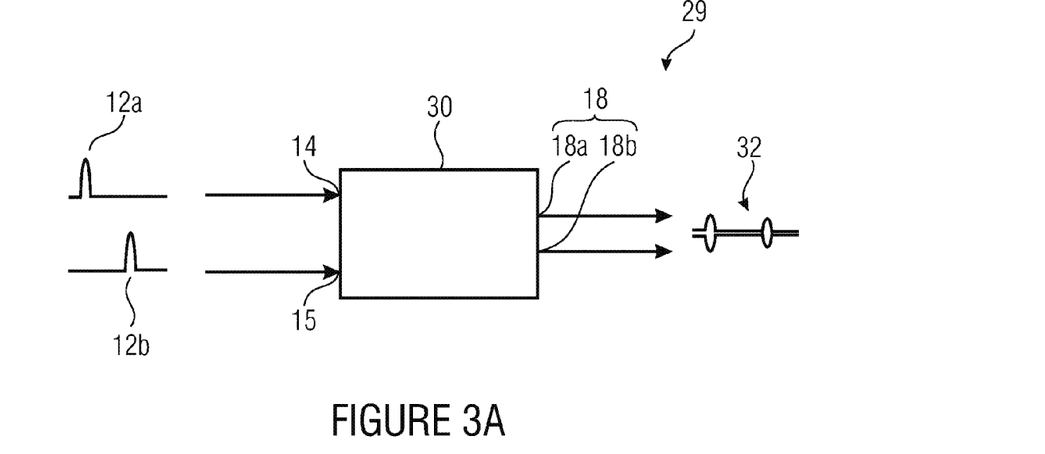
FIGS. 3a-3b are a schematical block diagram of a transmission device and the associated input and output variables according to one embodiment.

FIG. 3a shows a transmission device 29 having a signal converter 30 including a first measurement signal input 14, a second (inverted) measurement signal input 15 and a differential measurement signal output 18 having two signal conductor terminals 18a and 18b.

Figure 3B:
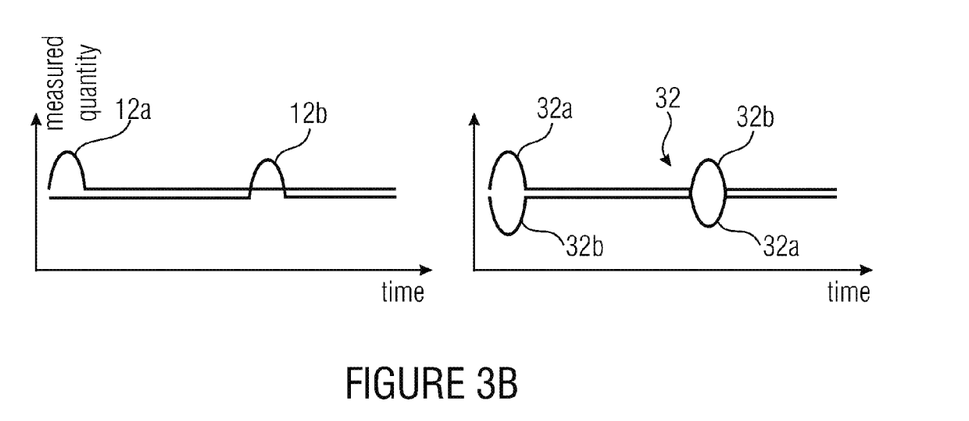

Via the first measurement signal input 14 a first single-ended measurement signal 12a may be received, and via the second measurement signal input 15 a second single-ended measurement signal 12b may be received. The two received single-ended measurement signals 12a and 12b are illustrated in FIG. 3b in a first diagram (plotted over time). As may be seen, the two single-ended measurement signals 12a and 12b occur at different times and each have a short time duration (pulse character). The consequence is that the probability of receiving two single-ended measurement signals 12a and 12b at the same time (i.e. as a consequence of two independent events in two sensors) is low. The first diagram further shows that the two single-ended measurement signals 12a and 12b are unipolar, as each of the single-ended measurement signals 12a and 12b (when detecting a measurement variable) is controlled from the baseline only in one direction. These baselines or the basic signal level is constant and results, for example, from the base/quiescent sensor current while the detection of the respective measured value (radiation event) results in a local maximum with respect to the baseline. From the radiation event also a negative single-ended measurement signal 12a or 12b which is negative with respect to the basic signal level, i.e. a local minimum, may result, so that the polarity of the differential measurement signal 32 consequently is also inverted (i.e. 16a'<16b'). It is to be noted that the height of the base sensor current level of the individual sensor elements may vary slightly.

The signal converter 30 is implemented to convert the two single-ended measurement signals 12a and 12b into differential measurement signals, combine the same and provide the same at the differential measurement signal output 18 as a combined differential measurement signal 32 in order to thus acquire a bundling of the two single-ended measurement signals 12a and 12b into one transmission channel. When converting the single-ended measurement signals 12a and 12b, due to the unipolar character of the same only half of the differential signal area is used. This characteristic may be utilized when combining the two single-ended measurement signals 12a and 12b to maintain the assignability of the individual differential portions with respect to the respective single-ended measurement signals 12a and 12b. In this respect, for example the second single-ended measurement signal 12b may be inverted so that the two single-ended measurement signals 12a and 12b differ with respect to their polarity.

When considering the second diagram of FIG. 3b which illustrates the differential measurement signal 32 with its two signal portions 32a and 32b, this principle becomes clear. The combined differential measurement signal 32 includes the single-ended measurement signals 12a and 12b in a differential form, i.e. as a difference of the absolute amounts between the two signal portions 32a and 32b, wherein the difference between the two signal portions 32a and 32b comprises maxima at the time of the local maximum of the first single-ended measurement signal 12a and at the time of the maximum of the second single-ended measurement signal 12b. When considering the two signal portions 32a or 32b separately, it may be seen that the first signal portion 32a comprises a local maximum at the time of the maximum of the first single-ended measurement signal 12a and a local minimum at the time of the maximum of the second single-ended measurement signal 12b. Vice versa, the second signal portion 32b at the time of the maximum of the first single-ended measurement signal 12a comprises a local minimum and at the time of the local maximum of the second single-ended measurement signal 12b comprises a local maximum. Insofar, by the absolute comparison of the two signal portions 32a and 32b, a differentiation of the two single-ended measurement signals 12a and 12b is possible. In other words, this means that a first single-ended measurement signal 12a (which is received via the first measurement signal input 14) results in a differential measurement signal 32 in which the first signal portion 32a is larger than the second signal portion 32b, while a second single-ended measurement signal 12b (which is received via the second measurement signal input 15) results in a differential measurement signal 32 in which the second signal portion 32b is greater than the first signal portion 32a. Insofar, due to the polarity, each part of the differential measurement signal 32 (and thus the time to be determined of an event detected by means of a sensor element connected to the first and second measurement signal inputs 14 and 15) may clearly be associated to an event.

When comparing the two diagrams, it becomes clear that the differential measurement signal 32 as compared to the original single-ended measurement signal 12a or the single-ended measurement signal 12b comprises an amplitude which is double as high, which contributes to an improved signal quality just like the increased interference signal tolerance (due to a low signal-to-noise ratio). This is why, according to further embodiments, the signal converter 30 or the transmission device 29 is implemented to provide the differential measurement signal 32 so that the amount or magnitude of the same is n times the single-ended measurement signal 12a or the single-ended measurement signal 12b. This signal amplitude ratio may be lost when the two single-ended measurement signals 12a and 12b simultaneously form a local maximum or overlapping local maxima as a consequence of a simultaneously detected event. By this, the two signal portions 32a and 32b would partially overlap or cancel each other out, which according to further embodiments leads to the fact that an error may be detected as a consequence of an implausible signal.

By inverting the second measurement signal input 15 and the fact that the used sensor elements typically comprise a comparable baseline or a comparable idle signal level, the common-mode portions (see reference potential 20) of the single-ended measurement signals 12a and 12b are reduced. In this respect, even a complete canceling (or averaging) of the common-mode portions may result when the idle signals are the same. The background here is that the second inverted single-ended measurement signal 12b represents the reference signal for the first single-ended measurement signal 12a, while the first single-ended measurement signal 12a represents the reference signal for the second single-ended measurement signal 12b. As the two signals 12a and 12b are signals of the same kind generated by members of the same kind, the two single-ended measurement signals 12a and 12b typically have the same or a similar temperature-dependent performance so that, by the inversion, a temperature compensation takes place at the same time.

In the following, two specific embodiments of a signal converter will be described.

Figure 4A:
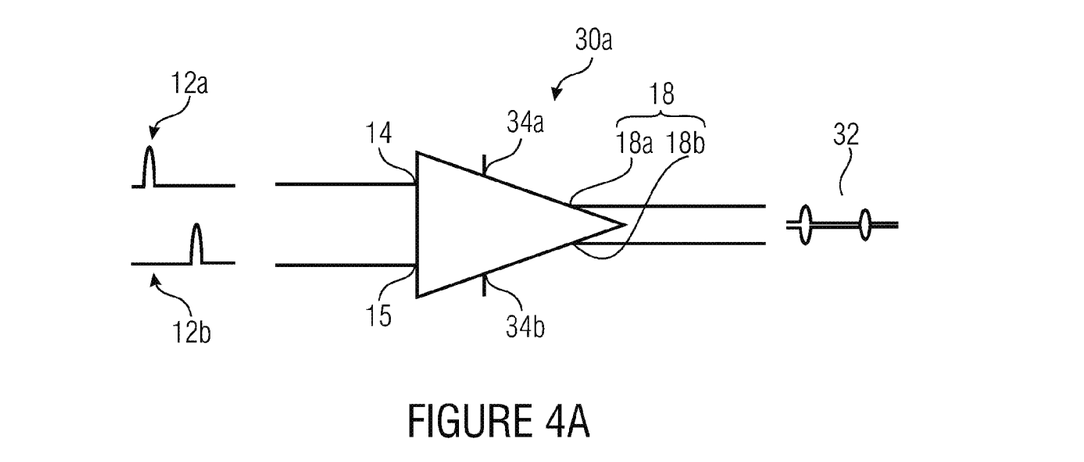
FIG. 4a is a schematical block diagram of a transmission device having a differential amplifier according to one embodiment.

FIG. 4a shows a differential amplifier or operational amplifier 30a comprising a first measurement signal input 14 and a second measurement signal input 15 which is typically inverted, and a differential measurement signal output 18. Further, the differential amplifier 30a additionally comprises two supply voltage terminals 34a and 34b. It is to be noted that here only a minimum terminal configuration is illustrated, even if an operational amplifier 30a described here may frequently comprise further terminals, e.g. for a signal offset.

Such a differential amplifier 30a may function as a signal converter 30, as the same is implemented, as was mentioned above, to convert single-ended measurement signals into differential measurement signals. In order to convert the two single-ended measurement signals 12a and 12b into the combined differential measurement signal 32 by means of this differential amplifier 30a, the first single-ended measurement signal 12a is coupled in via the first measurement signal input 14 and the second single-ended measurement signal 12b via the second (inverted) measurement signal input 15, so that the differential measurement signal 32 may be output via the differential output 18. It is further to be noted that via the voltage supply terminals 34a and 34b the supply voltage for the differential amplifier 30a is connected, by means of which the operating point may be set by a variation of the supply voltage. For using such a differential amplifier 30a for converting single-ended measurement signals into differential measurement signals, the differential amplifier 30a is typically embedded into a circuitry including at least one feedback path (not illustrated) having an integrated resistor. This feedback path is typically coupled between one of the signal conductors 18a or 18b and one of the measurement signal terminals 14 and 15. According to further embodiments, the circuitry may also include two parallel feedback paths, i.e. a first one between the first measurement signal input 14 and the first signal conductor 18a and a second one between the second measurement signal input 15 and the second signal conductor 18.

Figure 4B:
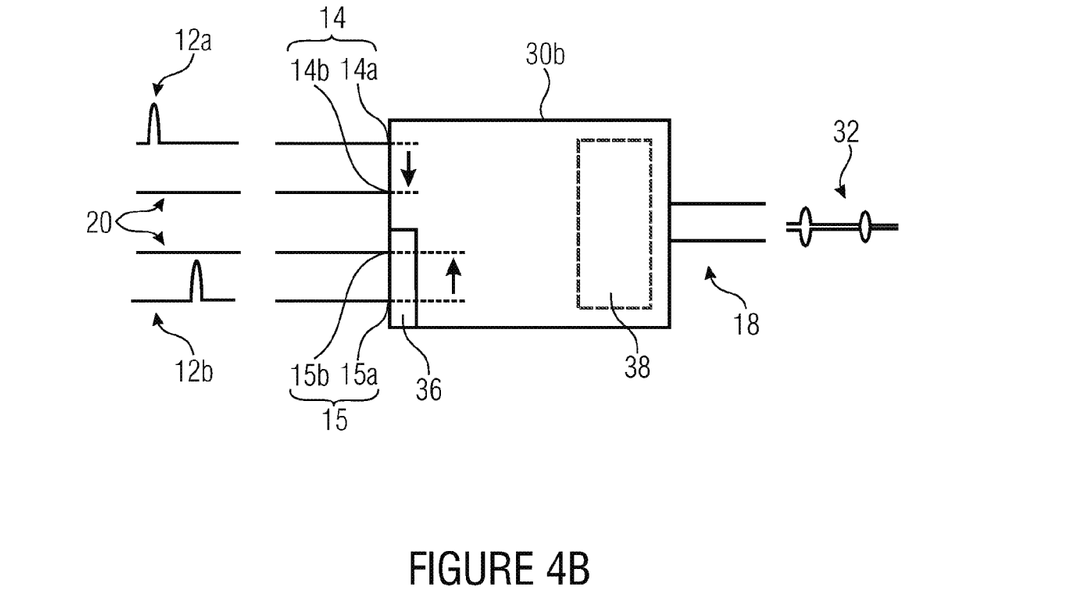
FIG. 4b is a schematical block diagram of a transmission device having a single-ended-to-differential converter according to one embodiment.

FIG. 4b shows a further implementation of a signal converter 30b comprising a first measurement signal input 14 and a second measurement signal input 15 as well as a differential measurement signal output 18. In this embodiment, the measurement signal input 14 is formed by a differential measurement signal input, wherein via a first signal conductor 14a the first single-ended measurement signal 12a may be received with respect to a reference signal 20 which is applied to the second signal conductor 14b. By analogy to this, the second measurement signal input 15 is formed by a differential measurement signal input, which comprises a first signal conductor 15, via which the second single-ended measurement signal 12b may be received with respect to a reference signal 20 which is applied to the second signal conductor 15b. It is further to be noted that here the second measurement signal input 15 is typically inverting or comprises an optional inverter 36.

In this implementation, as was described above, the single-ended measurement signal 12a or the single-ended measurement signal 12b is processed as described above as a differential signal with respect to a reference signal 20. The reference signal 20 which may be the same for both differential inputs 14 and 15 and is applied to the second signal conductor 14b or 15b each may, for example, be a mass signal or an average value of the two single-ended signals 12*a* and 12*b*. Thus, the procedure may be carried out as described above. The first differential measurement signal input 14 is directly coupled to the differential measurement signal output 18, while the second measurement signal input 15 is inversely coupled to the differential measurement signal output 18. As in a wiring of this kind common-mode portions frequently occur, as was already described above, the signal converter 30*b* may comprise an optional common-mode rejection circuit 38.

Figure 5:
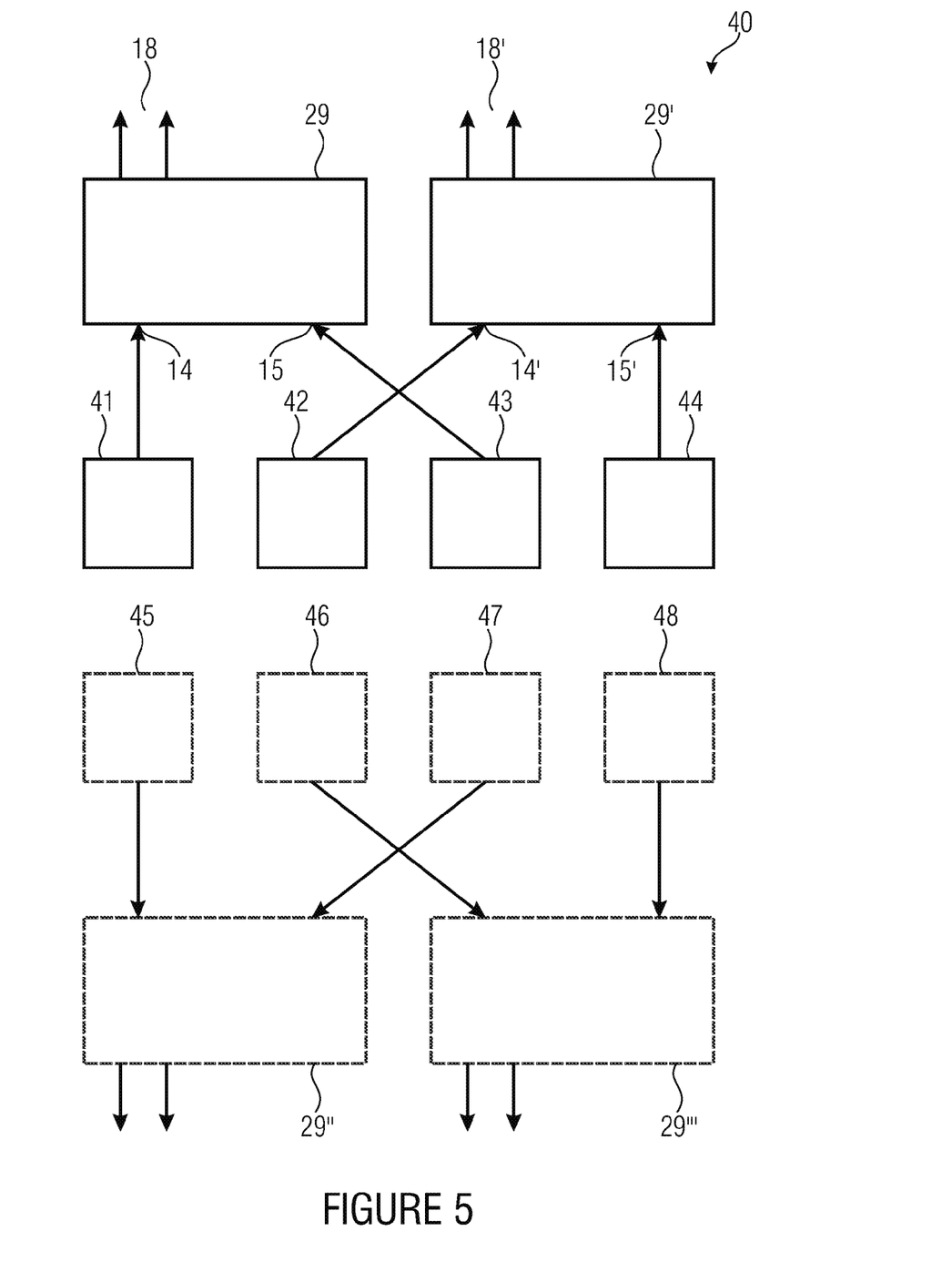
FIG. 5 is a schematical block diagram of an interleaved sensor system according to one embodiment.

In the following, a sensor system 40 will be described wherein a plurality of the above-described transmission devices 29 are used.

FIG. 5 shows a first transmission device 29 and a second transmission device 29', each comprising a differential output 18 or 18' and two measurement signal inputs 14 and 15 or 14' and 15'. Further, FIG. 5 shows four sensor elements 41, 42, 43 and 44 arranged next to each other, like, for example pixels of a pixel array. Here, the first sensor element 41 is connected to the first measurement signal input 14 of the first transmission device 29, while the third sensor element 43 is connected to the second signal input 15 of the first transmission device. Vice versa, the second sensor element lying between the first sensor element 41 and the third sensor element 43 is connected to the first signal input 14' of the second transmission device 29', so that measurement signals from two neighboring sensor elements are differentially transmitted by means of different transmission devices 29 or 29'. For the sake of completeness it is to be noted that the fourth sensor element 44 which lies next to the third sensor element 43 is coupled to the second signal input 15' of the second transmission device 29'.

This principle may continue into all vertical directions of expansion of the pixel array, as is illustrated by the optional sensor elements 45, 46, 47 and 48 of the second row. These four sensor elements 45, 46, 47 and 48 are also cross-connected to the two optional transmission devices 29' and 29'''. The advantage of this type of cross-connection is that in this way crosstalk of neighboring sensor elements may be detected, as the same are transmitted via separate transmission devices 29 or 29' (or 29'' and 29'''). The background here is that two pulse signals of two neighboring sensors (simultaneously) detecting a radiation pulse acting upon both sensor elements do not cancel each other out. In this respect, an interleaved arrangement of the individual sensor elements 41 to 48 results. It is to be noted here that this illustration is merely exemplary and that also the cross-connection may be realized in a different form.

Further embodiments relate to an evaluation device which is implemented to receive the differentially transmitted measurement signal from two sensor elements typically outputting single-ended measurement signals and to allocate the portions in the differential measurement signal 32 to the individual single-ended measurement signals or sensor elements. This allocation, as was described above, is done by a comparison of the absolute signal portions 32*a* and 32*b* to each other.

It is to be noted here that using the above-described devices also static signals may be detected, converted and transmitted, so that the signal form is not limited to pulse signals, sinusoidal signals or in general to alternating signals. The static portion may, if necessitated, be changed depending on the circuit used.

Although some aspects were described in connection with a device, it is obvious that those aspects also represent a description of the corresponding method, so that a block or a member of a device may also be regarded as a corresponding method step or as a feature of a method step. By analogy with this, aspects which were described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A sensor system, comprising:
   a plurality of sensor elements each providing pulse-shaped single-ended measurement signals; and
   at least two single-ended-to-differential converters, each comprising:
      a first measurement signal input for receiving a first single-ended measurement signal and a second measurement signal input for receiving a second single-ended measurement signal;
      a differential measurement signal output; and
      a signal converter which is implemented to convert the two single-ended measurement signals into a differential measurement signal,
   wherein the differential measurement signal comprises a first and a second differential portion as two output signals on two signal lines, and wherein the first portion or the first output signal is derived from the difference of the two input signals, and the second portion or the second output signal is derived from the inverted difference of the two input signals,
   wherein a first sensor element is connected to a first of the two measurement signal inputs of the first single-ended-to-differential converter and a second sensor element is connected to a first of the two measurement signal inputs of the second single-ended-to-differential converter, and
   wherein a third sensor element, which is arranged non-adjacent to the first sensor element, is connected to a second one of the two measurement signal inputs of the first single-ended-to-differential converter.

2. The sensor system according to claim 1, wherein the signal converter is a circuitry which comprises at least one differential amplifier.

3. The sensor system according to claim 2, wherein the differential amplifier comprises a non-inverted input coupled to the first measurement signal input, an inverted input coupled to the second measurement signal input and a differential output forming the differential measurement signal output.

4. The sensor system according to claim 3, wherein the circuitry comprises at least one feedback path feeding back a first or second terminal of the differential measurement signal output via a resistance to the non-inverted or inverted input.

5. The sensor system according to claim 1, wherein the signal converter comprises a first measurement signal input which is not inverting and a second measurement signal input which is inverting and is further implemented to form a first differential signal between the first single-ended measurement signal and a first reference signal and a second differential signal between the second single-ended measurement signal and a second reference signal and to combine the first and second differential signals.

6. The sensor system according to claim 5, wherein the first and second reference signals are a mass signal or an average value signal between the first and second single-ended measurement signals.

7. The sensor system according to claim 5, wherein the signal converter comprises a common-mode rejection circuit.

8. The sensor system according to claim 1, wherein the signal converter is implemented to balance a common-mode portion of the first single-ended measurement signal and the second single-ended measurement signal.

9. The sensor system according to claim 1, wherein the first measurement signal input and the second measurement signal input are interconnected such that the first single-ended measurement signal represents a reference signal for the second single-ended measurement signal and vice versa.

10. The sensor system according to claim 9, wherein the first measurement signal input and the second measurement signal input are inverted with respect to each other so that a common-mode portion of the first single-ended measurement signal, which is unipolar with respect to a first reference value, and of the second single-ended measurement signal, which is unipolar with respect to a second reference value, is reduced.

11. The sensor system according to claim 8, wherein the signal converter is implemented to provide the combined differential measurement signal, which is bipolar with respect to an average value, such that
an amount of the first single-ended measurement signal with respect to the first reference value and an amount of the second single-ended measurement signal with respect to the second reference value corresponds to 1/n times an amount between a first signal portion of the differential measurement signal and a second signal portion of the differential measurement signal with n≥1.

12. The sensor system according to claim 11, wherein the signal converter is implemented to provide the combined differential measurement signal such that the first signal portion of the differential measurement signal is greater than the second signal portion of the differential measurement signal when the first single-ended measurement signal is received and that the second signal portion of the differential measurement signal is greater than the first signal portion of the differential measurement signal when the second single-ended measurement signal is received.

13. The sensor system according to claim 11, wherein the signal converter is implemented to provide the combined differential measurement signal such that
the amount of the first single-ended measurement signal with respect to the first reference value or the amount of the second single-ended measurement signal with respect to the second reference value deviates from 1/n times the amount between the first signal portion and the second signal portion when the first single-ended measurement signal and the second single-ended measurement signal temporally overlap.

14. The sensor system according to claim 1, wherein the plurality of the sensor elements are pixels of a pixel sensor or pixels of a pixel sensor for a positron emission tomography.

15. A method for transmitting at least three electric pulse-shaped single-ended measurement signals, comprising:
receiving the first single-ended measurement signal of a first sensor element via a first measurement signal input and the second single-ended measurement signal of a third sensor element via a second measurement signal input of a first single-ended-to-differential converter;
receiving the third single-ended measurement signal of a second sensor element via a first measurement signal input of a second single-ended-to-differential converter; and
wherein the first single-ended-to-differential converter, converting the two single-ended measurement signals into a differential measurement signal, so that the differential measurement signal comprises a first and a second differential portion as two output signals on two signal lines, and wherein the first portion or the first output signal is derived from the difference of the two input signals, and the second portion or the second output signal is derived from the inverted difference of the two input signals;
wherein a third sensor element is arranged non-adjacent to the first sensor element.

* * * * *